US012241442B2

(12) United States Patent
Fuchs et al.

(10) Patent No.: US 12,241,442 B2
(45) Date of Patent: Mar. 4, 2025

(54) FUEL INJECTION DEVICE

(71) Applicant: Robert Bosch GmbH, Stuttgart (DE)

(72) Inventors: Alexander Fuchs, Adnet (AT); Christoph Eduard Kammerer, Linz (AT); Helmut Giessauf, Salzburg (AT); Martin Bernhaupt, Oberalm (AT); Walter Walkner, Hallein (AT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/260,689

(22) PCT Filed: Dec. 27, 2021

(86) PCT No.: PCT/EP2021/087665
§ 371 (c)(1),
(2) Date: Jul. 7, 2023

(87) PCT Pub. No.: WO2022/148679
PCT Pub. Date: Jul. 14, 2022

(65) Prior Publication Data

US 2024/0117784 A1 Apr. 11, 2024

(30) Foreign Application Priority Data

Jan. 11, 2021 (DE) ..................... 10 2021 200 154.8

(51) Int. Cl.
*F02M 63/02* (2006.01)
*F02M 37/00* (2006.01)

(52) U.S. Cl.
CPC .... *F02M 63/0275* (2013.01); *F02M 37/0041* (2013.01); *F02M 2200/28* (2013.01); *F02M 2200/40* (2013.01)

(58) Field of Classification Search
None
See application file for complete search history.

(56) References Cited

U.S. PATENT DOCUMENTS 5,497,750 A * 3/1996 Mueller ............. F02M 63/0007 123/446
6,363,914 B1 * 4/2002 Tanabe ................. F02M 47/027 123/514

(Continued)

FOREIGN PATENT DOCUMENTS

CN 202012427 U * 10/2011
DE 4341543 A1 * 6/1995 ......... F02M 63/0007

(Continued)

OTHER PUBLICATIONS

Translation of International Search Report for Application No. PCT/EP2021/087665 dated Apr. 7, 2022 (2 pages).

*Primary Examiner* — Kevin R Steckbauer
(74) *Attorney, Agent, or Firm* — Michael Best & Friedrich LLP

(57) ABSTRACT

The invention relates to a fuel injection device (100) for a compression-ignition engine, comprising a first storage unit (20) which can be supplied with fuel by at least one high-pressure pump (16), the first storage unit (20) being arranged preferably inside the high-pressure pump (16), a first connecting line (26) from the first storage unit (20) to a second storage unit (30), and a second connecting line (40) from the second storage unit (30) to a fuel injector (50).

8 Claims, 1 Drawing Sheet

(56) References Cited

U.S. PATENT DOCUMENTS

| | | | | |
|---|---|---|---|---|
| 6,536,416 | B1 * | 3/2003 | Mahr | F02M 47/027 123/496 |
| 6,776,140 | B2 * | 8/2004 | Maier | F02D 19/0657 123/456 |
| 6,851,412 | B2 * | 2/2005 | Jay | F02M 63/0225 123/456 |
| 7,025,045 | B2 * | 4/2006 | Hlousek | F02M 63/0215 123/467 |
| 7,059,303 | B2 * | 6/2006 | Magel | F02M 57/025 123/456 |
| 7,077,101 | B2 * | 7/2006 | Poola | F02D 41/3809 123/299 |
| 7,249,593 | B2 * | 7/2007 | Ricco | F02M 63/004 123/456 |
| 7,267,096 | B2 * | 9/2007 | Boecking | F02M 45/086 123/299 |
| 7,278,399 | B2 * | 10/2007 | Ricco | F02M 63/008 123/447 |
| 7,509,943 | B2 * | 3/2009 | Ricco | F02M 63/0285 123/456 |
| 7,588,016 | B2 * | 9/2009 | Pauer | F02M 55/02 123/456 |
| 7,603,984 | B2 * | 10/2009 | Ganser | F02M 47/027 123/456 |
| 7,976,073 | B2 * | 7/2011 | Mannucci | F02M 69/465 285/353 |
| 8,635,992 | B2 * | 1/2014 | Bernhaupt | F02M 55/00 123/445 |
| 9,234,486 | B2 * | 1/2016 | Das | F02M 63/0054 |
| 10,006,396 | B2 * | 6/2018 | Imhof | F02M 61/16 |
| 11,220,986 | B2 * | 1/2022 | Meier | F02D 19/0684 |
| 11,542,902 | B2 * | 1/2023 | Pirkl | F02M 61/165 |
| 2003/0183198 | A1 * | 10/2003 | Mahr | F02M 47/027 123/457 |
| 2003/0230284 | A1 * | 12/2003 | Jay | F02M 55/025 123/456 |
| 2004/0031468 | A1 * | 2/2004 | Poola | F02M 63/0205 123/446 |
| 2006/0000449 | A1 * | 1/2006 | Ricco | F02M 63/0225 123/458 |
| 2006/0000451 | A1 * | 1/2006 | Ricco | F02M 63/004 123/447 |
| 2006/0144964 | A1 * | 7/2006 | Boecking | F02M 45/086 239/533.2 |
| 2008/0184962 | A1 * | 8/2008 | Pauer | F02M 55/02 123/457 |
| 2008/0296413 | A1 * | 12/2008 | Ganser | F02M 47/027 239/533.4 |
| 2009/0230677 | A1 * | 9/2009 | Mannucci | F02M 69/465 285/318 |
| 2010/0175665 | A1 * | 7/2010 | Burger | F02M 47/027 123/456 |
| 2012/0205469 | A1 * | 8/2012 | Shen | F02M 61/168 239/584 |
| 2012/0291759 | A1 * | 11/2012 | Bernhaupt | F02M 63/0225 123/541 |
| 2015/0047612 | A1 * | 2/2015 | Das | F02M 55/002 123/447 |
| 2016/0195033 | A1 * | 7/2016 | Imhof | F02D 41/30 239/96 |
| 2018/0010535 | A1 * | 1/2018 | Posselt | F02M 43/00 |
| 2020/0362804 | A1 * | 11/2020 | Meier | F02M 63/0225 |
| 2021/0231087 | A1 * | 7/2021 | Pirkl | F16L 41/021 |
| 2024/0117784 | A1 * | 4/2024 | Fuchs | F02M 37/0041 |

FOREIGN PATENT DOCUMENTS

| | | | | |
|---|---|---|---|---|
| DE | 4344190 | A1 | 6/1995 | |
| EP | 2027385 | B1 | 3/2010 | |
| GB | 2353327 | A * | 2/2001 | F02M 45/00 |
| WO | 2013174601 | A1 | 11/2013 | |
| WO | WO-2022148679 | A1 * | 7/2022 | F02M 37/0041 |

* cited by examiner

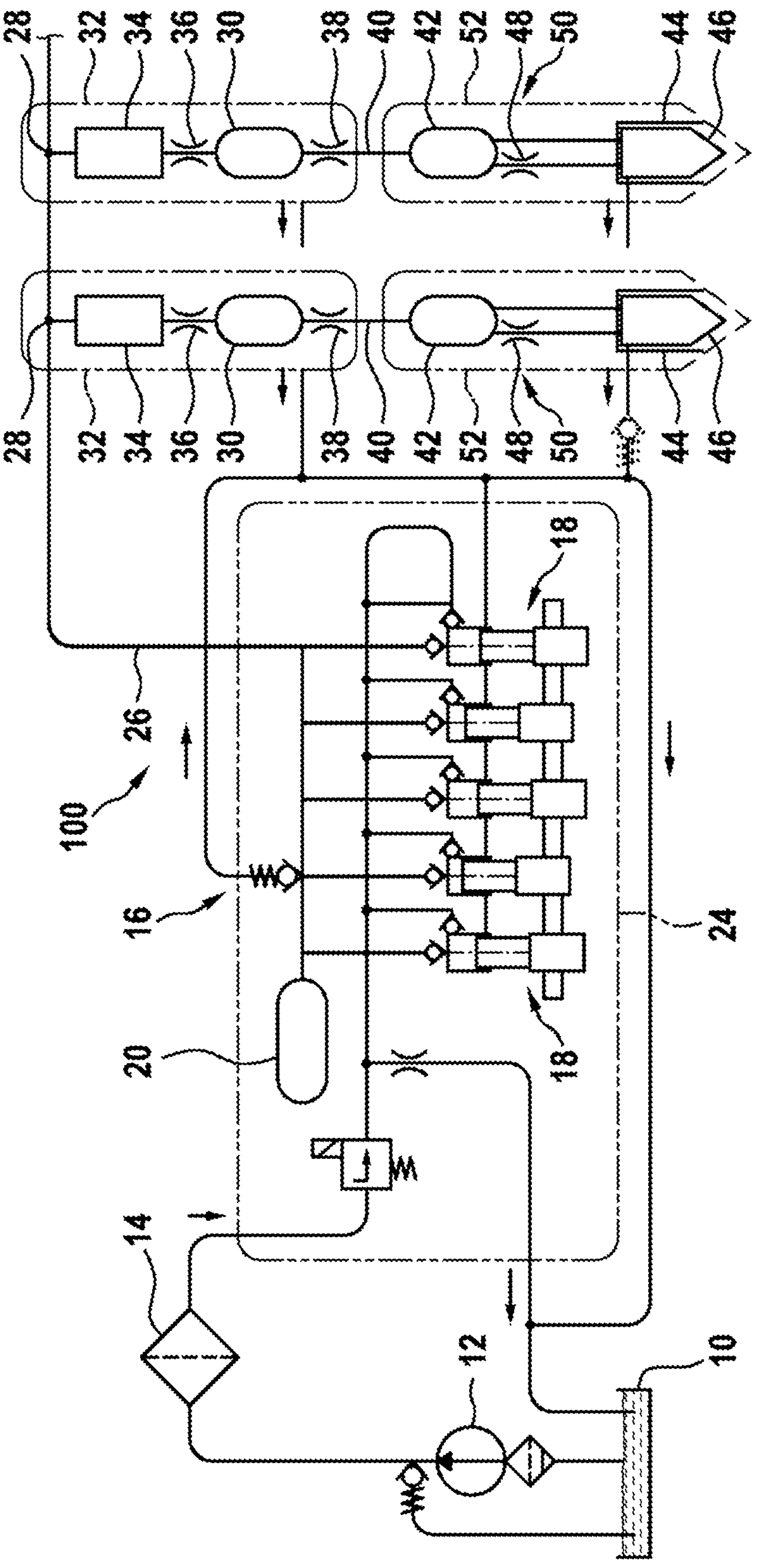
28
32
34
36
30
38
40
42
52
48
50
44
46
26
100
16
18
20
24
14
12
10

FUEL INJECTION DEVICE

BACKGROUND

The invention relates to a fuel injection device for compression-ignition engines, in particular in the form of a common rail injection system, which can be constructed using standard fuel injectors.

Fuel injection devices for compression-ignition engines are known from the prior art in a variety of constructive configurations. For example, it is known from DE 43 44 190 A1 to supply the respective fuel injector with high-pressure fuel via a common rail as the first storage unit, with interposition of a respective second storage unit for each fuel injector of an engine. The second storage units provided in addition to the common rail permit a better supply of fuel to the fuel injector or a lower pressure drop and lower pressure fluctuations, in particular at relatively high nominal injection amounts of the fuel injectors. This allows the desired or required dosing accuracy of the injection amounts to be better ensured. Fuel injectors are also known (EP 2 027 385 B1) in which the injector pin is arranged inside the housing of the fuel injector in the region of a high-pressure chamber, wherein the high-pressure chamber has a storage volume that is not described in further detail in the aforementioned document in terms of its size.

SUMMARY

The fuel injection device according to the invention, has the particular advantage that already existing engines can be equipped with fuel injectors having relatively high nominal injection amounts without significant structural changes. A nominal injection amount is understood to mean the injection amount that is injected into the cylinder of the engine at the nominal power and nominal speed of the engine per power stroke. A nominal injection amount typical in the context of the invention is approximately 1,730 $mm^3$ per power stroke per cylinder. In particular, it is not necessary to redesign the existing engine, for example by using differently configured receptacles for the fuel injectors in the cylinder housing or similar measures. Furthermore, the fuel injection device according to the invention allows such applications to be implemented with standardized components or assemblies according to a modular principle.

The invention is based on the idea of combining fuel injectors known per se from the prior art, in whose internal chambers or housings there is already a certain (third) storage volume so that the fuel injector itself represents a storage unit, with a first storage unit by interposition of a respective second storage unit for the respective fuel injector. By appropriately sizing the volumes of the second storage unit associated with the respective fuel injector as well as the third storage unit present inside the fuel injector, the desired relatively low pressure drop or low pressure fluctuations can be realized even at high nominal injection amounts of the fuel injector.

In order to reduce the size or volume of the second storage unit, on the one hand, and to be able to realize the desired low pressure fluctuations for the typically provided nominal injection amounts or to ensure a safe supply of fuel, on the other hand, it is provided in particular that the storage volumes of the second storage unit and the third storage units together correspond to between 20 times and 150 times the nominal injection amount of the fuel injector.

The size of the first storage unit configured in the conveyor pump is also significant, because it must ensure the supply of fuel to the individual fuel injectors, on the one hand, and primarily serves to attenuate the pressure pulsations produced by the conveyor strokes of the individual pump cylinders, on the other hand. For the applications contemplated in the context of the invention, storage volumes of the first storage unit of about 30 times the nominal injection amount have been found to be suitable for fulfilling the aforementioned tasks.

Various constructively advantageous variants are also provided with respect to controlling the flow amount to the fuel injectors or reducing pressure fluctuations during injection operations. A first such variant provides that a first throttle device restricting the flow rate is arranged between the first storage unit and the second storage unit, and a second throttle device restricting the flow rate is arranged between the second storage unit and the third storage unit.

In further development of such throttle devices, it is provided in particular that the first throttle device forms a common assembly unit with the second storage unit. A common assembly unit is understood in particular to mean that the second storage unit and the first throttle device are arranged inside a common housing.

A further structural simplification can be achieved when the second throttle device forms a common assembly with the second storage unit or when the second throttle device is arranged inside the fuel injector.

A further improvement of the desired relatively low pressure fluctuations during the injection operations can be achieved when a resonator throttle is arranged between the third storage unit and an injection element of the fuel injector.

The maximum flow amount at the fuel injector can also be restricted by arranging a flow restrictor upstream of the second storage unit. In this case, it is preferably constructively provided that the flow restrictor forms a common assembly unit with the second storage unit.

In particular, a fuel injection device as described thus far comprises a plurality of second storage units and a plurality of fuel injectors, which means that the engine has a plurality of cylinders and/or combustion chambers.

Further advantages, features, and details of the invention will emerge from the following description of preferred embodiments of the invention and from the drawings.

BRIEF DESCRIPTION OF THE DRAWINGS

In a system diagram, FIG. 1 shows a fuel injection device according to the present invention for a compression-ignition engine.

DETAILED DESCRIPTION

FIG. 1 shows the essential components of a fuel injection device 100 according to the invention for a compression-ignition, multi-cylindrical engine. The fuel injector 100 comprises a fuel reservoir 10 connected to a high-pressure pump 16 via a pre-feed pump 12 and a filter element 14. The high-pressure pump 16 serves to provide a system pressure of greater than 1500 bar, preferably greater than 2000 bar. For this purpose, the high-pressure pump 16 comprises, in a manner known per se, a plurality of pressure booster units 18 that convey the high-pressure fuel into the region of a first storage unit 20. The first storage unit 20 serves to supply a plurality of fuel injectors 50 simultaneously.

In the illustrated embodiment, the first storage unit 20 together with the high-pressure pump 16 forms a common assembly unit 24, and the first storage unit 20 is integrated inside the high-pressure pump 16.

At least indirectly, a high-pressure line 26 leads away from the first storage unit 20, from which line a respective branch 28 for each fuel injector 50 extends. Each branch 28 is connected to a second storage unit 30, in which the high-pressure fuel is temporarily stored. The second storage unit 30 is in particular arranged close to the cylinder of the engine. The second storage unit 30 is part of an assembly unit 32 comprising, for example, a flow restrictor 34. However, the flow restrictor 34 can also be embodied as a unit that is independent or separate from the assembly unit 32.

A first flow restrictor 36 is arranged in the flow path upstream of the second storage unit 30. In the illustrated exemplary embodiment, the first throttle device 36 is a component of the assembly unit 32. A second throttle device 38 is provided in the flow path between the second storage unit 30 and the fuel injector 50. The second throttle device 38, in the illustrated exemplary embodiment, is also part of a component of the assembly unit 32, but it can also be a component of or integrated inside the fuel injector 50.

A second connecting line 40 is arranged between the assembly unit 32 or second storage unit 30 and a housing 52 of the fuel injector 50. The second connecting line 40 serves to supply fuel to the fuel injector 50. In particular, the second supply line 40 opens into a third storage unit 42 arranged inside the housing 52. The third storage unit 42 is formed inside the housing 52 of the fuel injector 50. The third storage unit 42 leads to a high-pressure chamber 44 in which an injector pin 46, which can be moved up and down, is arranged as an injection element.

Using an actuator of fuel injector 50, which is not shown in detail and which enables the injector pin 46 to be lifted, fuel is injected into the combustion chamber of the engine in a manner known per se. Furthermore, it can be discerned that a resonator throttle 48 is arranged between the third storage unit 42 and the high-pressure chamber 44.

Essential for the desired functionality of the fuel injector device 100 or the fuel injectors 50 is that the volumes of the first storage unit 20, the second storage unit 30, and the third storage unit 42 are configured in a special manner relative to a nominal injection amount of the fuel injector 50. A nominal injection amount of the fuel injector 50 is understood to mean the injection amount that is injected into the cylinder of the engine at the nominal power and nominal speed of the engine per power stroke. With respect to the size of the individual fuel volumes, it is provided that the storage volume of the first storage unit 20 is between 20 times and 40 times, typically about 30 times, the nominal injection amount of the fuel injectors 50 connected to the first storage unit 20. Furthermore, the storage volumes of the second storage unit 30 and the third storage unit 42 together are 20 to 150 times, preferably 50 to 80 times, more preferably about 65 times the nominal injection amount of a fuel injector 50.

The fuel injection device 100 or fuel injectors 50 described thus far can be changed or modified in a variety of ways without departing from the idea of the invention.

The invention claimed is:

1. A fuel injection device (100) for a compression-ignition engine, the fuel injection device comprising a first storage unit (20) configured to be supplied with fuel by at least one high-pressure pump (16), the first storage unit (20) being arranged inside the high pressure pump (16), a first connecting line (26) from the first storage unit (20) to a second storage unit (30), and a second connecting line (40) from the second storage unit (30) to a fuel injector (50), wherein a third storage unit (42) is arranged inside a housing (52) of the fuel injector (50), which third storage unit is arranged separately from a high pressure chamber (44), in which an injection element (46) is arranged in a manner so as to be moved by lifting, and wherein a storage volume of the third storage unit (42) is a volume, corresponding to a plurality of nominal injection amounts of the fuel injector (50), wherein a first throttle device (36) restricting a flow rate is arranged between the first storage unit (20) and the second storage unit (30), and a second throttle device (38) restricting a flow rate is arranged between the second storage unit (30) and the third storage unit (42), and wherein a flow restrictor (34) distinct from the first throttle device (36) is arranged upstream of the second storage unit (30).

2. The fuel injector according to claim 1, wherein the storage volumes of the second storage unit (30) and the third storage unit (42) together correspond to between 20 times and 150 times the nominal injection amount of the fuel injector (50).

3. The fuel injector according to claim 1, wherein the storage volume of the first storage unit (20) corresponds to between 20 times and 40 times the nominal injection amount of the fuel injectors (50) connected to the first storage unit (20).

4. The fuel injector according to claim 1, wherein the first throttle device (36) forms a common assembly unit (32) with the second storage unit (30).

5. A fuel injector according to claim 1, wherein the second throttle device (38) forms a common assembly unit (32) with the second storage unit (30) or the second throttle device (38) is arranged inside the fuel injector (50).

6. The fuel injector according to claim 1, wherein a throttle (48) is arranged in a flow path between the third storage unit (42) and an injection element (46) of the fuel injector (50).

7. The fuel injector according to claim 1, wherein the flow restrictor (34) forms a common assembly unit (32) with the second storage unit (30).

8. The fuel injector according to claim 1, wherein a plurality of second storage units (30) and a plurality of fuel injectors (50) are provided.

* * * * *